(12) United States Patent
Khajavi et al.

(10) Patent No.: US 12,262,246 B2
(45) Date of Patent: Mar. 25, 2025

(54) INFORMATION AWARE V2X MESSAGING (71) Applicant: FORD GLOBAL TECHNOLOGIES, LLC, Dearborn, MI (US)

(72) Inventors: Navid Tafaghodi Khajavi, Troy, MI (US); Mohsen Bahrami, Birmingham, MI (US); Amin Ariannezhad, Troy, MI (US); Mohammad Nekoui, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1013 days.

(21) Appl. No.: 17/158,418

(22) Filed: Jan. 26, 2021

(65) Prior Publication Data

US 2022/0239743 A1    Jul. 28, 2022

(51) Int. Cl.
*H04W 28/06* (2009.01)
*H04W 28/02* (2009.01)

(52) U.S. Cl.
CPC ........ *H04W 28/06* (2013.01); *H04W 28/0215* (2013.01)

(58) Field of Classification Search
CPC .. H04W 28/0215; H04W 28/06; H04L 67/12; G06F 9/542
See application file for complete search history.

(56) References Cited

U.S. PATENT DOCUMENTS

| | | | |
|---|---|---|---|
| 8,453,041 B2 * | 5/2013 | Henderson, Jr. | G06F 11/10 341/51 |
| 2010/0085249 A1 | 4/2010 | Ferguson et al. | |
| 2017/0091302 A1 * | 3/2017 | Moser | G16B 40/20 |
| 2017/0268896 A1 * | 9/2017 | Bai | G01C 21/3484 |
| 2019/0357026 A1 | 11/2019 | Hwang et al. | |
| 2020/0192355 A1 * | 6/2020 | Lu | G08G 1/09675 |
| 2020/0284883 A1 * | 9/2020 | Ferreira | G01S 7/4811 |
| 2020/0307562 A1 * | 10/2020 | Ghafarianzadeh | G06V 40/25 |
| 2021/0281986 A1 * | 9/2021 | Zhu | H04L 63/1425 |
| 2022/0227389 A1 * | 7/2022 | Tam | G05D 1/617 |

FOREIGN PATENT DOCUMENTS

| | | |
|---|---|---|
| DE | 102018212313 A1 | 1/2020 |
| WO | 2020139510 A1 | 7/2020 |
| WO | WO-2021020623 A1 * | 2/2021 ........... H04B 17/373 |

OTHER PUBLICATIONS

RoAdNet: A Multi-resolution transmission strategy for long range information diffusion in VANETS (Year: 2019).*

* cited by examiner

*Primary Examiner* — Nguyen H Ngo
(74) *Attorney, Agent, or Firm* — Joseph Zane; Brooks Kushman P.C.

(57) ABSTRACT

A V2X event-message dictionary and a binning function are received from a cloud server. Sensor data is compared to events specified in the V2X event-message dictionary to identify a best-fit event for the sensor data. A number of bins and a bin number for the event are computed using the binning function. A V2X message is transmitted including the number of bins and the bin number, thereby avoiding including the sensor data in the V2X message.

24 Claims, 5 Drawing Sheets

INFORMATION AWARE V2X MESSAGING

TECHNICAL FIELD

Aspects of the present disclosure generally relate to information-aware efficient vehicle-to-everything (V2X) messaging.

BACKGROUND

V2X communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a system for information-aware efficient vehicle-to-everything (V2X) messaging is provided. The system includes a controller of a vehicle, programmed to receive a V2X event-message dictionary and a binning function from a cloud server; compare sensor data to events specified in the V2X event-message dictionary to identify a best fit event for the sensor data; compute a number of bins and a bin number for the event using the binning function; and transmit a V2X message including the number of bins and the bin number, thereby avoiding including the sensor data in the V2X message.

In one or more illustrative examples, a system for system for information-aware efficient V2X messaging is provided. The system includes a controller of a first vehicle, programmed to receive a V2X event-message dictionary and a binning function from a cloud server; receive a V2X message from a second vehicle; compare, as included in the V2X message, a number of bins and a bin number to events specified in the V2X event-message dictionary; and reconstruct aspects of an event specified by the V2X message according to the compare, thereby being notified of the event without receiving sensor data in the V2X message indicating the event.

In one or more illustrative examples, a method for information-aware efficient V2X messaging is provided. A V2X event-message dictionary and a binning function are received from a cloud server. Sensor data is compared to events specified in the V2X event-message dictionary to identify a best-fit event for the sensor data. A number of bins and a bin number for the event are computed using the binning function. A V2X message is transmitted including the number of bins and the bin number, thereby avoiding including the sensor data in the V2X message.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

To enable a higher level of automation and deal with increasingly complex road conditions, vehicles may be required to perform timely sharing of tremendous amount of data with other vehicles and roadside infrastructure. Meanwhile, with the growth of the connected car market, an increasing number of V2X applications are being created (such as for predictive maintenance, navigation, and infotainment services), which leads to a significant increase in bandwidth requirements. While information sharing is critical for successful implementation of many connected vehicle use cases, the limited bandwidth assigned to V2X makes it challenging to share messages all the times, especially in crowded regions such as downtowns. This issue can impact all critical and non-critical V2X use cases such as road congestion management and traffic related communications.

To efficiently communicate real-time, critical events via V2X, messages are encoded and compressed for different vehicle events. Some examples of such events are: signs information (e.g., traffic signs, traffic lights, . . . ), sensor information (e.g., object/accident detection and location sharing, out-of-sight vehicle information sharing), pedestrian behavior sharing, accident risk sharing, etc. Compression helps to lower data traffic and avoids possible congestion in V2X operation frequency bands.

An information-aware messaging protocol for communicating real-time events via V2X is proposed. In the proposed protocol, each vehicle adaptively adjusts and shares partial messages with other vehicles. The receiver may thus use the partial message as an extra information to assess the receiver's situation.

To perform the protocol, the set of all possible messages is divided into different groups, where only the group index information is shared via V2X. A simple example is to divide the set of messages into two main categories (critical or normal) based on the importance of the events. In this scenario, instead of sending entire messages, a vehicle may share one bit of information regarding the priority of the event. If necessary, more information can be queried from the vehicle. Further examples of using the protocol in V2X communication are described in detail herein.

Figure 1:
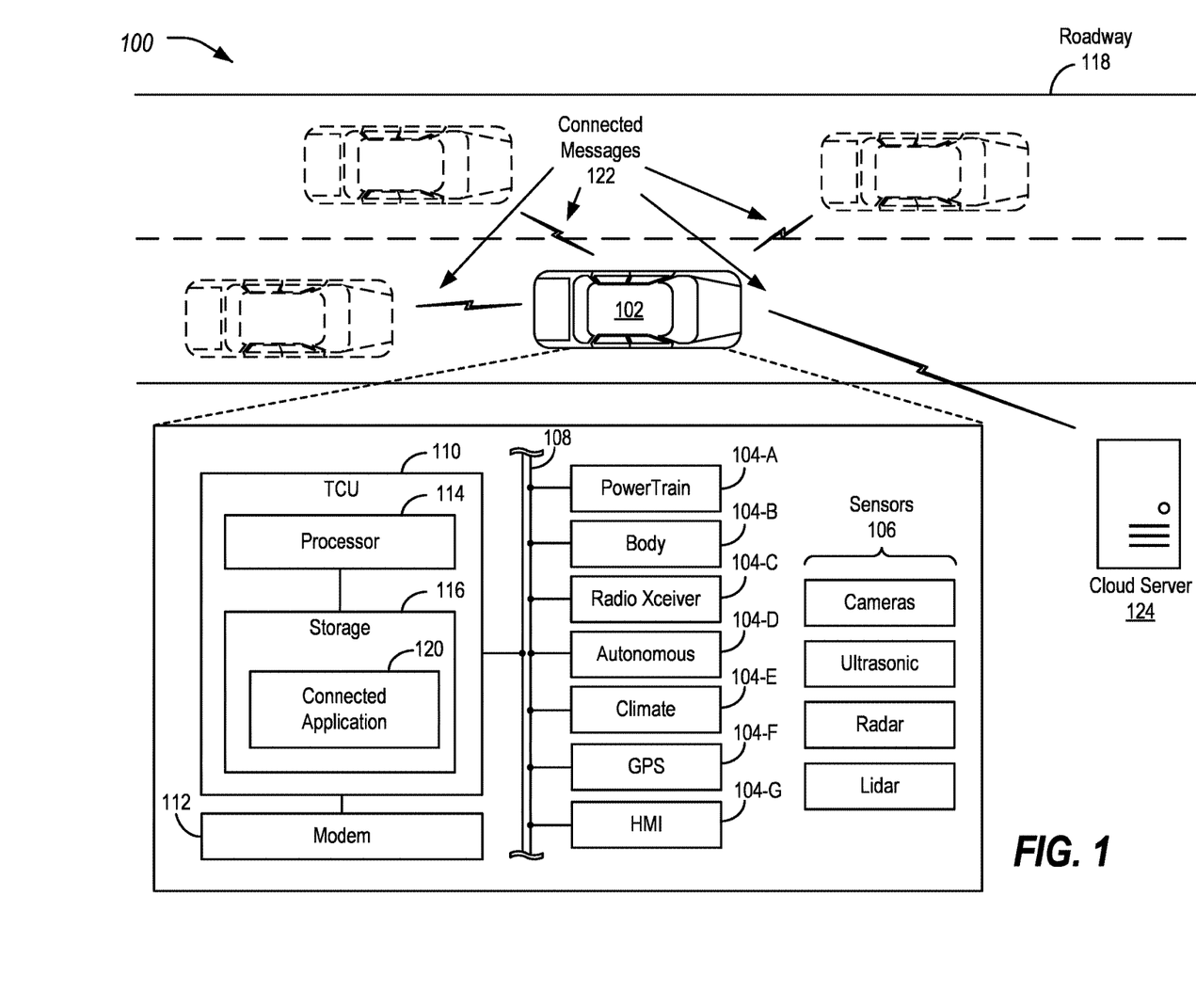
FIG. 1 illustrates an example system for the use of vehicles performing the information-aware messaging protocol over V2X.

FIG. 1 illustrates an example system 100 for the use of vehicles 102 performing the information-aware messaging protocol over V2X. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

The vehicle bus 108 may include various methods of communication available between the vehicle controllers 104, as well as between the telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a cellular modem 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 110 may be configured to include one or more interfaces from which vehicle information may be sent and received. This information can be sensed, recorded, and sent to the cloud server 124. In an example, the cloud server 124 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While only a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit connected messages 122 for reception by other vehicles 102. For instance, the frequency may be on the order of every ten milliseconds. The TCU 110 may be further configured to receive connected messages 122 from other vehicles 102. In an example, the management of sending and receiving of connected vehicle data may be handled by a connected application 120 executed by the TCU 110. The connected messages 122 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.). In one example, the connected messages 122 may take the form of BSM messages as described in the society of automotive engineers (SAE) standard document J2735.

While not shown, in some examples traffic participants may additionally involve communication via one or more roadside units (RSUs). The RSU may be a device with processing capabilities and networking capabilities, and may be designed to be placed in proximity of the roadway 118 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 118 or in a specific area. The RSU may also have wired or wireless backhaul capability to allow for communication with other elements of a traffic control system, via e.g., Ethernet, or cellular connection to the cellular network infrastructure, for example over Uu interface.

Figure 2:
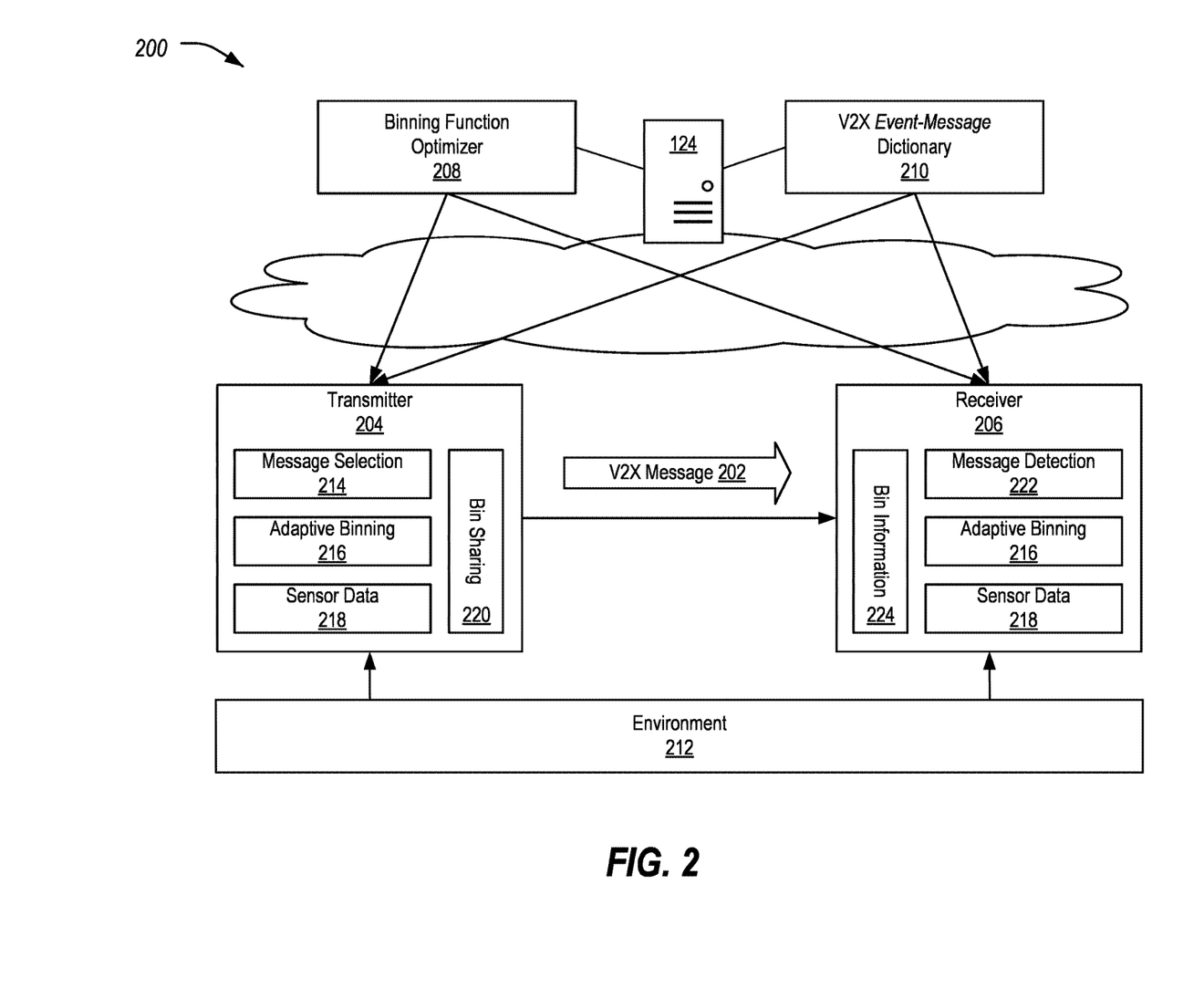
FIG. 2 illustrates an example data flow diagram for operation of the information-aware messaging protocol.

FIG. 2 illustrates an example data flow diagram 200 for operation of the information-aware messaging protocol. As shown, a V2X message 202 is sent from a transmitter 204 (e.g., a vehicle 102 sending the V2X message 202) to a receiver 206 (e.g., a vehicle 102 receiving the V2X message 202). While only one receiver 206 for the V2X message 202 is shown, it should be noted that there may be multiple receivers 206 of the V2X message 202.

As further shown, the cloud server 124 includes a binning function optimizer 208 as well as a V2X event-message dictionary 210. Generally, the binning function optimizer 208 may be configured to use historical data to learn an optimal binning function which then will be shared with all vehicles 102 and other traffic participants using the information-aware messaging protocol. As shown, the binning function optimizer 208 may receive V2X transmission beam information (such as beam tracking and beam alignment) and incorporate that data to pick the best binning function for a region. The V2X event-message dictionary 210 may include a set of predefined messages for predefined events. The V2X event-message dictionary 210 may also be shared with the vehicles 102 and other traffic participants.

To perform the protocol, the set of all possible V2X messages 202 is divided into different groups, where only the group index information is shared via V2X. A simple example is to divide the set of V2X messages 202 into two main categories (e.g., critical or normal) based on the importance of the events. In this scenario, instead of sending entire V2X messages 202, a vehicle 102 may share one bit of information regarding the priority of the event. If necessary, more information can be queried from the vehicle 102. Thus, each transmitter 204 adaptively adjusts and shares partial V2X messages 202 with other vehicles 102, where the receiver 206 may use the partial V2X message 202 as an extra information to assess the situation.

In an example, a set of V2X messages 202 indicates eight possible levels at an intersection. Without binning, three bits of information would be required to share via V2X a value having eight possibilities (as $2^3=8$). Using a binning strategy and depending on factors such as traffic, weather, and lighting conditions, the following scenarios may occur:

(i) If the receiver 206 vehicle 102 is further than a first distance from an event location, the condition is divided into two categories (low, high).

(ii) If the receiver 206 vehicle 102 is closer than the first distance but further than a second distance from the event location, the condition is divided into four categories (no, low, medium, high).

(iii) If the receiver 206 vehicle 102 is closer than the second distance to the event location, the condition is divided into eight categories without binning (no, low, medium low, medium, medium high, high, very high, extreme).

Referring more specifically to the two vehicle 102 example illustrated in the example data flow diagram 200, assume that the transmitter 204 identifies an event that falls into a kth group, e.g., $m_{n_k}$. The number of groups may be determined based on AV V2X messaging design parameters and their values captured in real-time. Some examples of these factors are road conditions, distance to receiving vehicle 102, ADAS equipment on the receiving vehicle 102, V2X congestion level, etc. The event does not necessarily require to be one of the predefined event/messages identified in the V2X event-message dictionary 210. If the event is not specifically included in the V2X event-message dictionary 210, the vehicle 102 may find a closest match by looking at all events in the V2X event-message dictionary 210.

With respect to the characteristics of the V2X event-message dictionary 210, as the nature of the events occurs in regions varies (e.g., downtown area, a suburban area, etc.), a corresponding V2X event-message dictionary 210 for the given region may vary. This degree of freedom allows for optimal mapping and lower data traffic with respect to the expected level of congestion in a given area.

A binning function B(k) may be defined, where given input k, the function B divides all n messages in k groups as follows (groups does not necessarily have the same number of messages). An example binning is shown in Table 1.

TABLE 1

Example Messaging Binning

| Bin 1 | Bin 2 | ... | Bin k |
|---|---|---|---|
| $e_1, m_1$ | $e_{n_1+1}, m_{n_1+1}$ | ... | $e_{n_{k-1}+1}, m_{n_{k-1}+1}$ |
| ... | ... | ... | ... |
| $e_{n_1}, m_{n_1}$ | $e_{n_2}, m_{n_2}$ | ... | $e_{n_k}, m_{n_k}$ |

For the simplest grouping, k=2, all messages are in two groups and for k=n each message has its own group. The binning function B may be computed based on each region and may be provided to vehicles 102 and infrastructure devices (e.g., RSUs in the environment 212, etc.).

As a specific example of a binning with k=2, two message categories may be defined (e.g., critical/non-critical). In the example, it can be assumed by design that critical messages in an example 8-bit binary format contain at least 5 zeros. Similarly, non-critical messages may be defined as those having at least 5 ones.

To perform the binning, a binning function may compute the Hamming distance between each designed message and an 8-bit zero (00000000) reference message. In this example, if the distance between any message and reference message is less than 4, the message may be categorized into the critical category (bin), but if the difference is more than 4 then the message is categorized into the non-critical category (bin). This may be expressed as follows:

Critical message=01010010→H-dist=3

NonCritical message=01011110→H-dist=5

While this example utilizes Hamming distance, it should be noted that other closeness measures can be used. As another example, the closeness measure maul be the divergence between the probability distribution of the events—relative entropy.

The transmitter 204 may utilize message selection 214 logic of the TCU 110 to identify occurrence of an event that should cause a V2X message 202 to be transmitted. In an example, as mentioned above, TCU 110 may be further configured to periodically transmit connected messages 122 for reception by other vehicles 102. For instance, the frequency may be on the order of every ten milliseconds. The connected messages 122 may include collected information retrieved from the controllers 104 over the vehicle buses 108. In many examples, the collected information data may include information useful for autonomous vehicle operations or driver-assistance vehicle operations. This collected information data may be referred to herein as sensor data 218. The TCU 110 may be further configured to utilize adaptive binning 216 logic to identify the bins to use and the bin in which the V2X message 202 to be transmitted should be included. The TCU 110 may also use bin sharing 220 logic to transmit the bin information in the V2X message 202.

Likewise, the receiver 206 may utilize message detection 222 logic of the TCU 110 to identify reception of the V2X message 202 from the transmitter 204. The TCU 110 may further utilize the adaptive binning 216 logic to identify the bins and the bin in which the V2X message 202 that was received is included according to the bin information 224 shared by the transmitter 204. Accordingly the receiver 206 may be able to identify aspects of the sensor data 218 from the minimal bin information of the V2X message 202. If necessary, more information can be queried from the from the transmitter 204.

Figure 3:
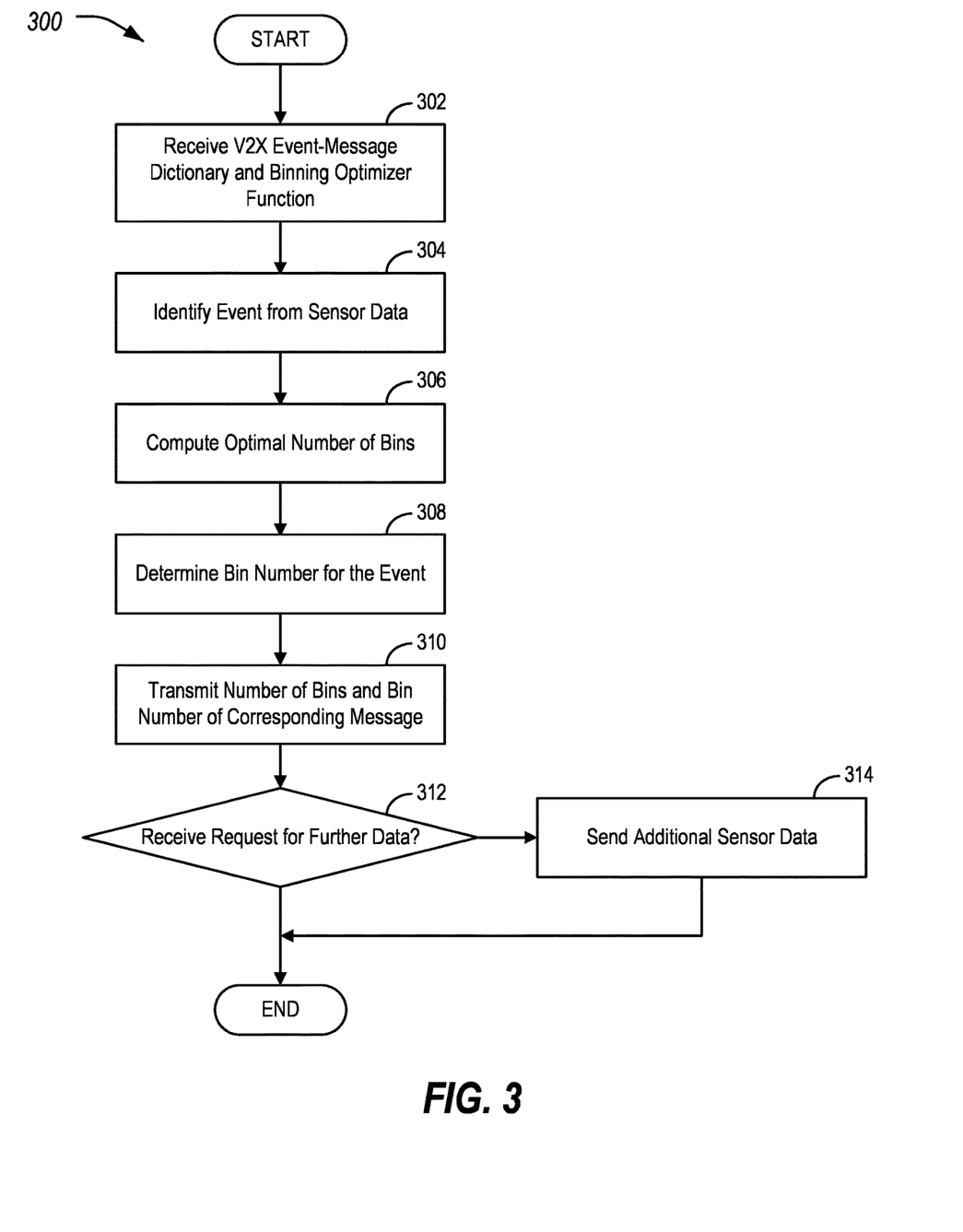
FIG. 3 illustrates an example process for operation of the information-aware messaging protocol for the transmitter.

FIG. 3 illustrates an example process 300 for operation of the information-aware messaging protocol for the transmitter 204. In an example, the process 300 may be performed responsive to the vehicle 102 identifying occurrence of an event that should cause a V2X message 202 to be transmitted.

At operation 302, the transmitter 204 receives the binning function optimizer 208 and the V2X event-message dictionary 210 from the cloud server 124. The binning function optimizer 208 may allow the vehicle 102 to perform adaptive binning 216 according to the binning function B(k). The V2X event-message dictionary 210 may allow the vehicle 102 to match current sensor data 218 one of the events described by the dictionary 210.

At operation 304, the transmitter 204 identifies an event to transmit based on the sensor data 218. In an example, the transmitter 204 may compare current sensor data 218 to the events specified in the V2X event-message dictionary 210 to identify a best fit for the sensor data 218 to transmit.

At operation 306, the transmitter 204 computes an optimal number of bins for transmission of the event. In an example, the transmitter 204 utilizes the binning function B(k) received to the adaptive binning 216 logic to identify the number of bins to use based on factors such as road conditions, distance to receiving vehicle 102, ADAS equipment on the receiving vehicle 102, V2X congestion level, etc.

At operation 308, the transmitter 204 determines a bin number for transmission of the event. For instance, the transmitter 204 utilizes the adaptive binning 216 logic to determine in which bin the event for the V2X message 202 to be transmitted should be included. An example binning is shown in Table 1.

At operation 310, the transmitter 204 transmits the number of bins and the bin number of the event. Thus, instead of sending the entirety of the sensor data 218, the transmitter 204 instead is able to send a small set of information.

At operation 312, the transmitter 204 determines whether a request was received for further data. For instance, a recipient of the V2C message sent at operation 310 may, in some cases, desire further information with respect to the binned event. If so, control passes to operation 314 to send additional sensor data 218 to the requester. If not, and also after operation 312, the process 300 ends.

Figure 4:
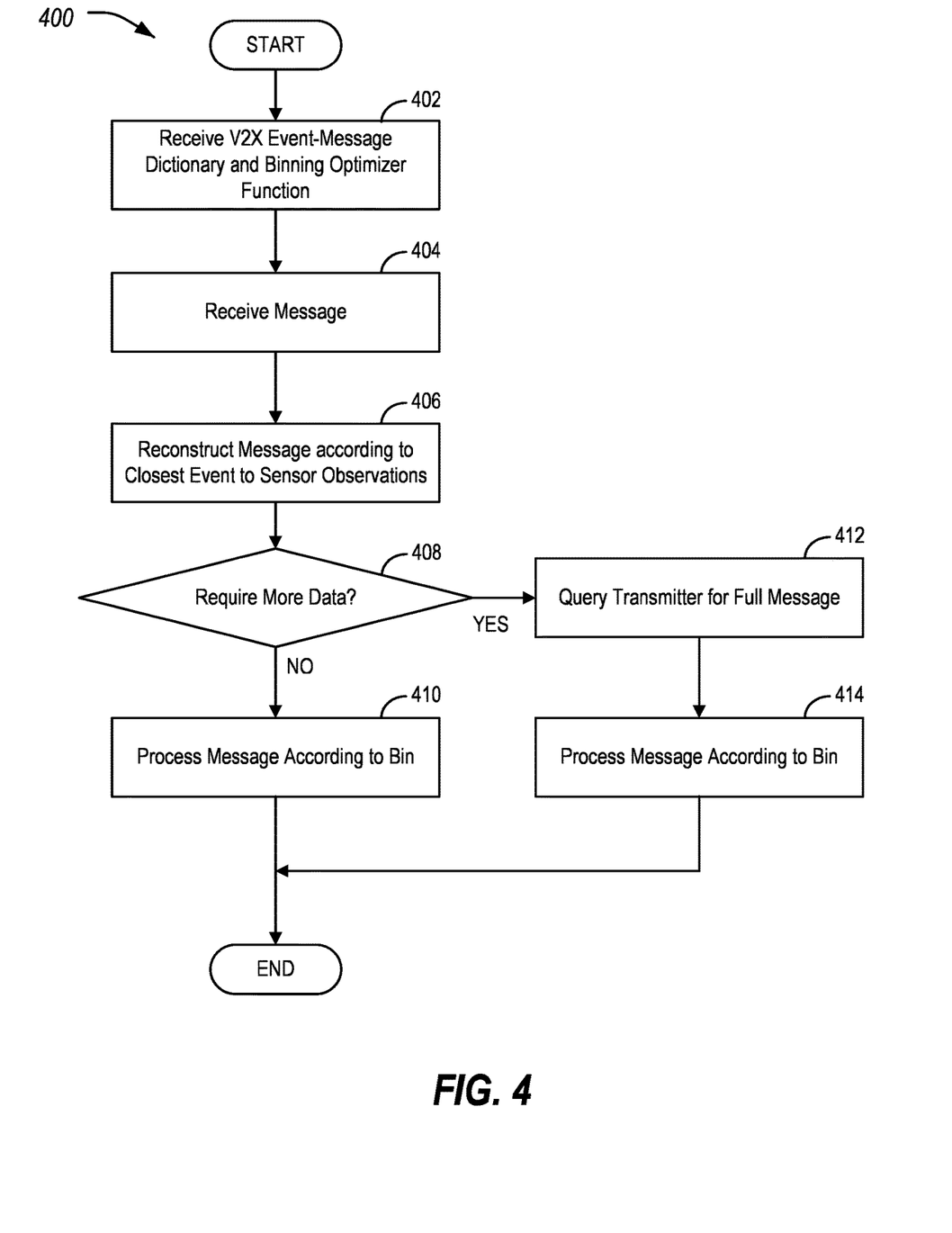
FIG. 4 illustrates an example process for operation of the information-aware messaging protocol for the receiver.

FIG. 4 illustrates an example process 400 for operation of the information-aware messaging protocol for the receiver 206. At operation 402, the receiver 206 receives the binning function optimizer 208 and the V2X event-message dictionary 210 from the cloud server 124. The binning function optimizer 208 may allow the vehicle 102 to perform adaptive binning 216 according to the binning function B(k). The V2X event-message dictionary 210 may allow the vehicle 102 to match current sensor data 218 one of the events described by the dictionary 210.

At operation 404, the receiver 206 receives a V2X message 202. The V2X message 202 may be received from the transmitter 204 as discussed about with respect to operations 302-314 of the process 300.

At operation 406, the receiver 206 reconstructs the V2X message 202 according to the closest event to the sensor observations indicated by the V2X event-message dictionary 210. In an example, similar to the process performed at operations 306 and 308 of the process 300, the receiver 206 uses the number of bins and the indicated bin to work backwards to determine the probable event according to the events listed in the V2X event-message dictionary 210 for the corresponding bin determined using the binning function B(k) via the binning function optimizer 208.

At operation 408, the receiver 206 determines whether additional data is required. In an example, the receiver 206 may conclude that none of the events in the received bin are worthy of further data. For instance, the V2X message 202 may indicate an event too far away from the receiver 206 to be at issue or may indicate an event of a type that the receiver 206 does not require further specifics about. If so, control passes to operation 410 to process the V2X message 202 as-is. In such cases, the V2X message 202 may be handled by the receiver 206 without full sending of the sensor data 218. After operation 410, the process 400 ends.

If, however, the receiver 206 determines that additional information about the V2X message 202 is desirable to have to process the message, control passes to operation 412 to cause the receiver 206 to query the transmitter 204 for additional message detail, as discussed with respect to operation 312 of the process 300. At operation 414, the receiver 206 receives the additional message detail from the transmitter 204, as discussed with respect to operation 314 of the process 300. After operation 414, the process 400 ends.

Thus, events via are encoded and sent via V2X in a compressed form to help lower data traffic and avoid possible congestion in V2X operation frequency bands. This novel information-aware messaging protocol for communicating real-time events further allows the vehicles 102 to adaptively adjust and share partial V2X messages 202 with other vehicles 102. The receiver 206 may thus use the partial V2X messages 202 as extra information to assess the situation, while still being able to request further uncompressed data if necessary.

Figure 5:
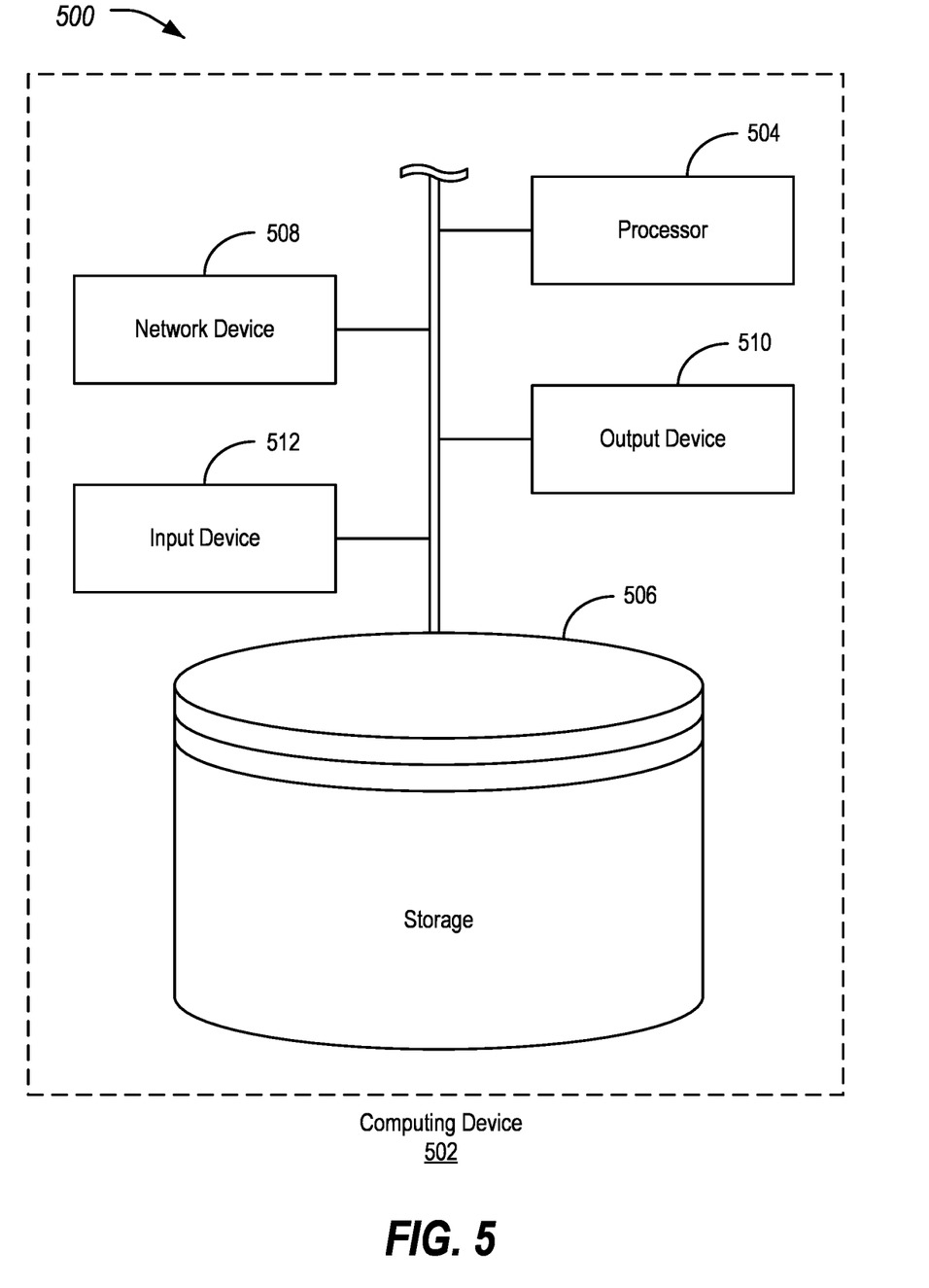
FIG. 5 illustrates an example of a computing device for the operation of the information-aware messaging protocol.

FIG. 5 illustrates an example 500 of a computing device 502 for the operation of the information-aware messaging protocol. Referring to FIG. 5, and with reference to FIGS. 1-4, the vehicles 102, controllers 104, TCU 110, transmitter 204, receiver 206, and the cloud server 124 may be examples of such computing devices 502. As shown, the computing device 502 includes a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the vehicles 102 and cloud server 124 to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for information-aware efficient vehicle-to-everything (V2X) messaging, comprising:
    a controller of a vehicle, programmed to
        receive a V2X event-message dictionary and a binning function from a cloud server, the V2X event-message dictionary matching sensor data to events, the binning function dividing the events into event groups based on a bitwise closeness measure to a reference message;
        compare the sensor data to the events specified in the V2X event-message dictionary to identify a best-fit event for the sensor data;
        compute a number of bins and a bin number for the event using the binning function; and
        transmit a V2X message including the number of bins and the bin number, instead of including the sensor data in the V2X message.

2. The system of claim 1, wherein the controller is further programmed to:
    receive a request over V2X from a second vehicle for further data responsive to the V2X message; and
    transmit the sensor data in a second V2X message to the second vehicle responsive to the request.

3. The system of claim 1, wherein the controller is further programmed to:
    identify a distance from a receiving vehicle;
    when the receiving vehicle is further than a first distance from a location of the event, utilize a first number of bins; and
    when the receiving vehicle is closer than the first distance from the location of the event but further than a second distance from the location of the event, utilize a second number of bins greater than the first number of bins.

4. The system of claim 3, wherein the controller is further programmed to:
    when the receiving vehicle is closer than the second distance from the location of the event, utilize a third number of bins greater than the second number of bins.

5. The system of claim 4, wherein the third number of bins specifies a number of bins equal to a total number of unique events specified in the V2X event-message dictionary.

6. The system of claim 1, wherein the V2X event-message dictionary specifies a first set of events for urban areas, and a second, different set of events for non-urban areas.

7. The system of claim 1, wherein the number of bins is two, a first bin indicates a critical message type, a second bin indicates a non-critical message type, and the bin number indicates either the first bin for the critical message type or the second bin for the non-critical message type.

8. A system for information-aware efficient V2X messaging, comprising:
    a controller of a first vehicle, programmed to
        receive a V2X event-message dictionary and a binning function from a cloud server, the V2X event-message dictionary matching sensor data to events, the binning function dividing the events into event groups based on a bitwise closeness measure to a reference message;
        receive a V2X message from a second vehicle;
        compare, as included in the V2X message, a number of bins and a bin number to events specified in the V2X event-message dictionary; and reconstruct aspects of an event specified by the V2X message according to the compare, thereby being notified of the event without receiving sensor data in the V2X message indicating the event.

9. The system of claim 8, wherein the controller of the first vehicle is further programmed to:
send a request over V2X to the first vehicle for further data responsive to the V2X message; and
receive the sensor data in a second V2X message responsive to the request.

10. The system of claim 8, further comprising:
a controller of the second vehicle, programmed to
receive the V2X event-message dictionary and the binning function from the cloud server;
compare the sensor data to the events specified in the V2X event-message dictionary to identify a best-fit for the event for the sensor data;
compute the number of bins and the bin number for the event using the binning function; and
transmit the V2X message including the number of bins and the bin number, thereby avoiding including the sensor data in the V2X message.

11. The system of claim 10, wherein:
the controller of the first vehicle is further programmed to:
send a request over V2X to the second vehicle for further data responsive to the V2X message, and
receive the sensor data in a second V2X message responsive to the request; and
the controller of the second vehicle is further programmed to:
receive the request over V2X from the first vehicle, and
transmit the sensor data in the second V2X message to the first vehicle.

12. The system of claim 10, wherein the controller of the second vehicle is further programmed to:
identify a distance from the first vehicle;
when the first vehicle is further than a first distance from a location of the event, utilize a first number of bins; and
when the first vehicle is closer than the first distance from the location of the event but further than a second distance from the location of the event, utilize a second number of bins greater than the first number of bins.

13. The system of claim 12, wherein the controller of the second vehicle is further programmed to:
when the first vehicle is closer than the second distance from the location of the event, utilize a third number of bins greater than the second number of bins.

14. The system of claim 13, wherein the third number of bins specifies a number of bins equal to a total number of unique events specified in the V2X event-message dictionary.

15. The system of claim 10, wherein the V2X event-message dictionary specifies a first set of events for urban areas, and a second, different set of events for non-urban areas.

16. The system of claim 10, wherein the number of bins is two, a first bin indicates a critical message type, a second bin indicates a non-critical message type, and the bin number indicates either the first bin for the critical message type or the second bin for the non-critical message type.

17. A method for information-aware efficient V2X messaging, comprising:
receiving a V2X event-message dictionary and a binning function from a cloud server, the V2X event-message dictionary matching sensor data to events, the binning function dividing the events into event groups based on a bitwise closeness measure to a reference message;
comparing the sensor data to the events specified in the V2X event-message dictionary to identify a best-fit event for the sensor data;
computing a number of bins and a bin number for the event using the binning function; and
transmitting a V2X message including the number of bins and the bin number, thereby avoiding including the sensor data in the V2X message.

18. The method of claim 17, further comprising:
receiving a request over V2X from a second vehicle for further data responsive to the V2X message; and
transmitting the sensor data in a second V2X message to the second vehicle responsive to the request.

19. The method of claim 17, further comprising:
identifying a distance from a receiving vehicle;
when the receiving vehicle is further than a first distance from a location of the event, utilizing a first number of bins; and
when the receiving vehicle is closer than the first distance from the location of the event but further than a second distance from the location of the event, utilizing a second number of bins greater than the first number of bins.

20. The method of claim 19, further comprising, when the receiving vehicle is closer than the second distance from the location of the event, utilizing a third number of bins greater than the second number of bins, wherein the third number of bins specifies a number of bins equal to a total number of unique events specified in the V2X event-message dictionary.

21. The method of claim 17, further comprising:
receiving, as included in the V2X message, the number of bins and the bin number to the events specified in the V2X event-message dictionary; and
reconstructing aspects of the event specified by the V2X message, including using the number of bins and the indicated bin to work backwards to determine the probable event according to the events listed in the V2X event-message dictionary, thereby being notified of the event without receiving sensor data in the V2X message indicating the event.

22. The system of claim 1, wherein the binning function computes the closeness measure using a Hamming distance between each designed message and the reference message.

23. The system of claim 22, wherein the number of bins is at least two, the events are categorized into a first of the bins based on the Hamming distance being below a predefined threshold, and the events are categorized into a second of the bins based on the Hamming distance being above the predefined threshold.

24. The system of claim 1, wherein the binning function computes the closeness measure using a divergence between a probability distribution of the events.

* * * * *